(12) United States Patent
Kawagishi et al.

(10) Patent No.: US 7,859,242 B2
(45) Date of Patent: Dec. 28, 2010

(54) DC-DC CONVERTER

(75) Inventors: Norihiro Kawagishi, Tokyo (JP); Yuichi Okubo, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 253 days.

(21) Appl. No.: 12/327,001

(22) Filed: Dec. 3, 2008

(65) Prior Publication Data
US 2009/0160418 A1 Jun. 25, 2009

(30) Foreign Application Priority Data
Dec. 19, 2007 (JP) .............................. 2007-326783

(51) Int. Cl.
*G05F 3/04* (2006.01)
*G05F 3/08* (2006.01)
*G05F 3/16* (2006.01)
*G05F 3/20* (2006.01)

(52) U.S. Cl. ....................... 323/311; 323/313
(58) Field of Classification Search ......... 323/311–313, 323/315–316
See application file for complete search history.

(56) References Cited

U.S. PATENT DOCUMENTS 6,215,291 B1 * 4/2001 Mercer ...................... 323/313
6,924,693 B1 * 8/2005 Black .......................... 323/315
7,019,584 B2 * 3/2006 Bartel et al. ................. 323/316
2003/0218454 A1 * 11/2003 Cunnac et al. .............. 323/316
2004/0145361 A1 * 7/2004 Owen .......................... 323/313
2006/0279269 A1 * 12/2006 Yang .......................... 323/313
2007/0024263 A1 * 2/2007 Yang .......................... 323/315

FOREIGN PATENT DOCUMENTS

| JP | 09-135132 | 5/1997 |
| JP | 2007-10635 A | 1/2007 |
| JP | 2007209103 | 8/2007 |
| JP | 2007-241411 | 9/2007 |

OTHER PUBLICATIONS

Japanese Office Action Dated Nov. 10, 2009 With English Translation.
Japanese Patent Office Action Dated Feb. 1, 2010 With English Translation.

* cited by examiner

*Primary Examiner*—Bao Q Vu
*Assistant Examiner*—Jue Zhang
(74) *Attorney, Agent, or Firm*—Volentine & Whitt, PLLC

(57) ABSTRACT

A DC-DC converter includes a reference voltage generation circuit. The reference voltage generation circuit generates a reference voltage for determination of the pulse width of a drive signal to be supplied to a switching circuit. The reference voltage generation circuit includes a current sensing circuit. The current sensing circuit has a first MOS transistor, a second MOS transistor, a resistive element and an amplifier circuit.

9 Claims, 2 Drawing Sheets

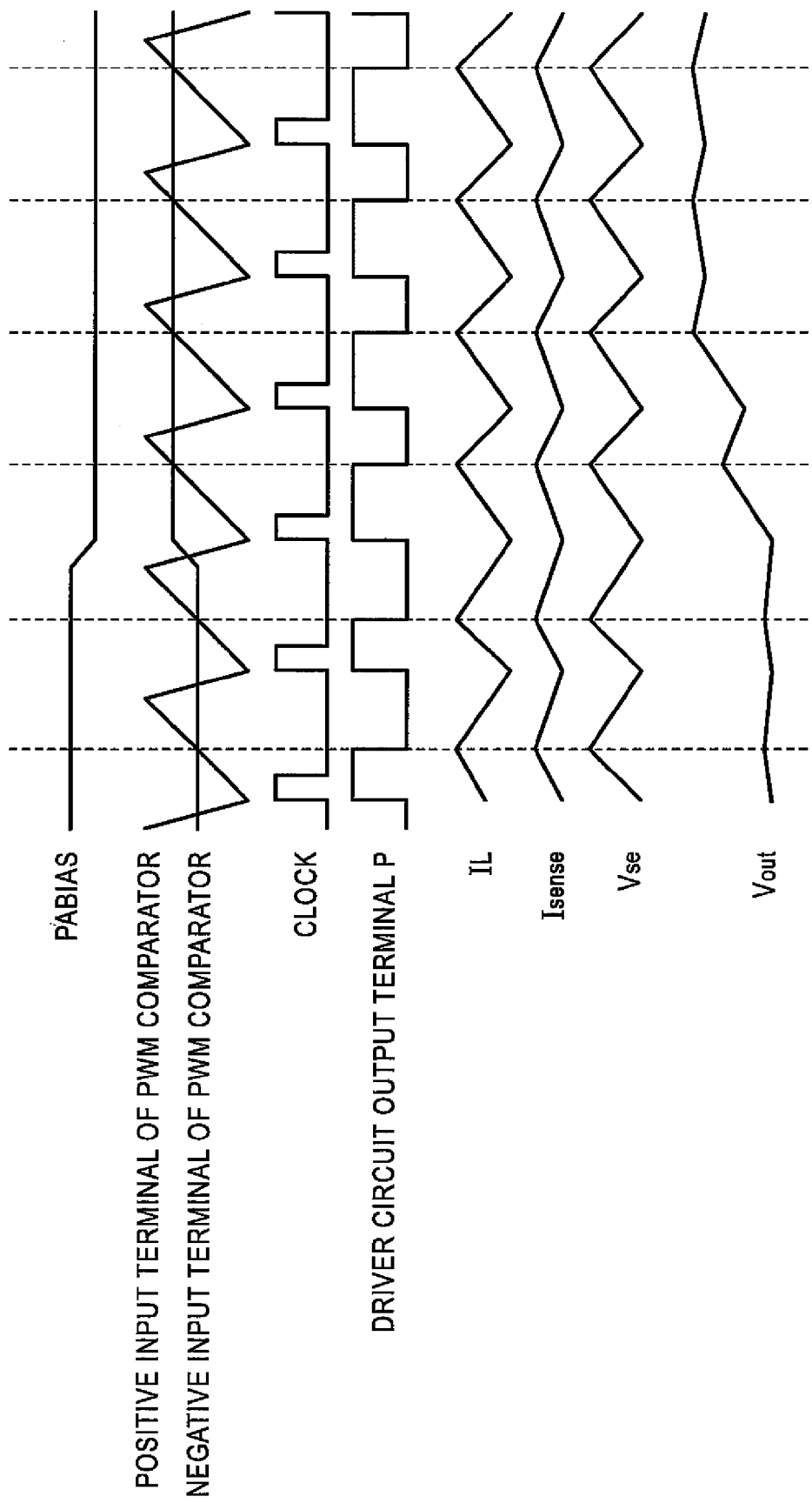

DC-DC CONVERTER

BACKGROUND OF THE INVENTION

1. Field of the Invention

The present invention relates to a DC-DC converter that outputs (creates) a stable voltage using an unstable external power source. DC stands for direct current.

2. Description of the Related Art

A DC-DC converter is known as a device for supplying a stable output voltage of a desired level from an unstable voltage source, irrespective of a variation in an input voltage to the DC-DC converter or a changing output load connected to the DC-DC converter. One example of the unstable voltage source is a rectified line voltage which has an unstable amplitude.

DC-DC converters may generally be categorized into a voltage mode control (VMC) type and a current mode control (CMC) type depending on feedback schemes. In a DC-DC converter of the voltage mode control type, a part of an output voltage is fed back as a control signal to control the duty ratio of a switching element so as to stabilize the output voltage. In a DC-DC converter of the current mode control type, a variation in the current flowing through an inductor is also used for the control of the output voltage in addition to the duty ratio of the switching element in the DC-DC converter. Thus, the DC-DC converter of the current mode control type has many advantages such as excellent line regulation, easy phase compensation, easy current control, and appropriateness to large-capacity implementation owing to parallel connection. As a result, recently, the DC-DC converter of the current mode control type is more used than the DC-DC converter of the voltage mode control type.

Japanese Patent Application Kokai (Laid-open) No. 2007-209103 discloses a DC-DC converter of the current mode control type, which is capable of changing the value of an output voltage over a wide range depending on an input voltage. In the DC-DC converter disclosed in Japanese Patent Application Kokai No. 2007-209103, a voltage drop across an ON resistance of a P-type metal oxide semiconductor (MOS) transistor connected in parallel to a switching element is amplified by a magnification determined by the ratio of two resistors, in order to sense the current flowing through an inductor and in turn to control the output voltage.

SUMMARY OF THE INVENTION

In the DC-DC converter disclosed in Japanese Patent Application Kokai No. 2007-209103, a current proportional to the current flowing through the inductor is converted into a voltage by the MOS transistor connected in parallel to the switching element. However, this voltage conversion rate varies with the manufacture deviation (tolerance) and temperature dependency of the MOS transistor and an ambient temperature. Further, because the ON resistance of the MOS transistor varies with the gate voltage thereof, the MOS transistor has a supply voltage dependency.

On the other hand, a supply voltage is introduced through a resistor to a negative input terminal of an amplifier that amplifies the voltage drop of the MOS transistor. For this reason, the amplification factor of the amplifier becomes unstable due to temperature characteristics difference, etc. between the MOS transistor and resistor connected to the input terminal and a high precision of current sensing is thus made impossible. This results in unstableness of the output voltage.

An object of the present invention is to provide a DC-DC converter which is capable of performing a high precision of current sensing irrespective of element (device) characteristics such as a supply voltage dependency and a temperature dependency to achieve stabilization of an output voltage.

According to one aspect of the present invention, there is provided a DC-DC converter that includes a switching circuit adapted to be turned on in response to a drive signal for relaying a supply voltage (adjusted power source voltage) to an (external) output voltage terminal through an inductor. The DC-DC converter also includes a driving signal supply circuit for supplying the drive signal to the switching circuit. The DC-DC converter also includes a reference voltage generation circuit connected to the switching circuit. The reference voltage generation circuit generates a reference voltage based on an input-output voltage of the switching circuit (voltage across the input terminal and output terminal of the switching circuit). The DC-DC converter also includes a reset signal supply circuit connected to the reference voltage generation circuit. The reset signal supply circuit generates a reset signal based on the reference voltage and supplies the reset signal to the drive signal supply circuit. The reset signal stops the supply of the drive signal. The reference voltage generation circuit has a current sensing circuit. The current sensing circuit includes a first metal oxide semiconductor (MOS) transistor having a gate connected to the drive signal supply circuit and a source connected to the supply voltage. The current sensing circuit also includes a second MOS transistor connected in series to the first MOS transistor. The current sensing circuit also includes a resistive element connected in series to the second MOS transistor. The current sensing circuit also includes an amplifier circuit for amplifying the input-output voltage of the switching circuit and supplying the amplified voltage to a gate of the second MOS transistor.

The switching circuit may include a series circuit having an output voltage supply MOS transistor and an output voltage discharge MOS transistor. The switching circuit may further include another series circuit having two MOS transistors connected between the source and drain of the output voltage supply MOS transistor.

The first MOS transistor may have the same characteristics, with the exception of an ON resistance, as those of the voltage supply MOS transistor or one of the two MOS transistors. The ON resistance of the first MOS transistor may be smaller than that of the voltage supply MOS transistor or one of the two MOS transistors.

The resistive element may have a low temperature dependency. The resistive element may be a variable resistive element having a resistance varying with trimming.

In an exemplary DC-DC converter of the present invention, the reference voltage generation circuit, which generates a reference voltage $V_{ref}$ for determination of the pulse width of a drive signal to be supplied to the switching circuit, includes a current sensing circuit composed of a first MOS transistor, a second MOS transistor, a resistive element and an operational amplifier circuit. Therefore, it is possible to detect the current at high precision irrespective of element characteristics such as a supply voltage dependency and a temperature dependency. Accordingly, the present invention can achieve the output voltage stabilization.

BRIEF DESCRIPTION OF THE DRAWINGS

These and other objects, features, aspects and advantages of the present invention will be more clearly understood from the following detailed description when read in conjunction with the accompanying drawings, in which:

FIG. 2 is a timing chart illustrating the operation of the DC-DC converter shown in FIG. 1.

DETAILED DESCRIPTION OF THE INVENTION

Figure 1:
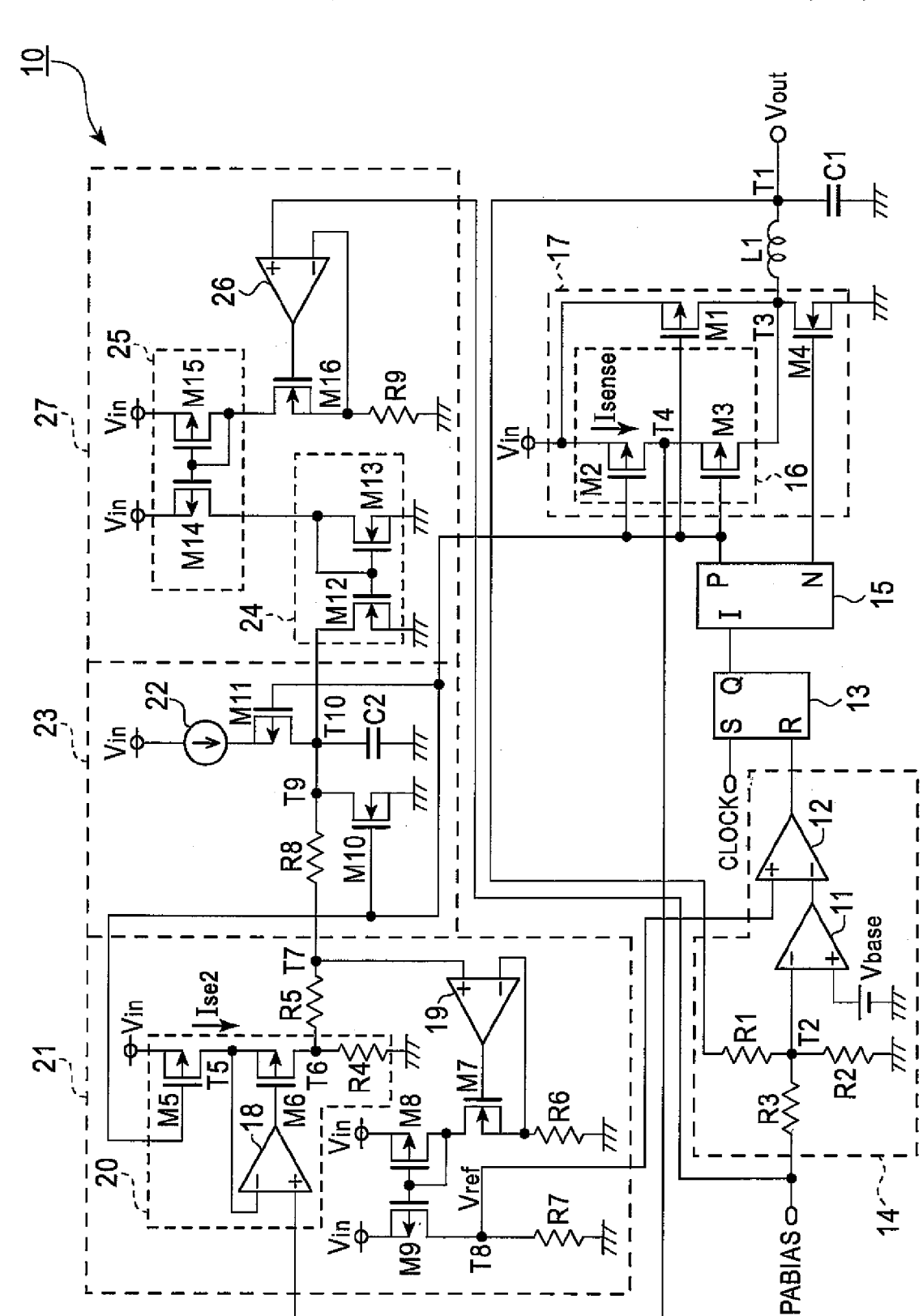
FIG. 1 is a circuit diagram showing the configuration of a DC-DC converter according to an exemplary embodiment of the present invention.

Hereinafter, preferred embodiments of the invention will be described in detail in conjunction with the accompanying drawings.

A DC-DC converter 10 according to an exemplary embodiment of the present invention will hereinafter be described in detail with reference to a circuit diagram of FIG. 1.

A capacitor C1, and a resistor R1 for sensing of an output voltage are connected to an (external) output voltage terminal $V_{out}$ through a connection point (pin) T1. A resistor R2 is connected to the resistor R1 through a connection point T2. The capacitor C1 and the resistor R2 are connected to a ground potential.

The resistor R1 and the resistor R2 are connected to a negative input terminal of an error amplifier circuit 11 through the connection point T2. An external control voltage input terminal PABIAS is connected to the negative input terminal of the error amplifier circuit 11 through a resistor R3 and the connection point T2.

The error amplifier circuit 11 has a positive input terminal connected to the ground potential through a base voltage $V_{base}$. As a result, the base voltage $V_{base}$ is applied to the positive input terminal of the error amplifier circuit 11. The error amplifier circuit 11 has an output terminal connected to a negative input terminal of a pulse width modulation (PWM) comparator 12.

A reference voltage generation circuit 21 is connected to a positive input terminal of the PWM comparator 12, and a reference voltage $V_{ref}$ from the reference voltage generation circuit 21 is applied to the positive input terminal of the PWM comparator 12. The PWM comparator 12 has an output terminal connected to a reset input terminal R of a flip-flop circuit 13.

In this embodiment, the error amplifier circuit 11, PWM comparator 12, resistor R1, resistor R2, resistor R3 and reference voltage $V_{base}$ constitute in combination a reset signal supply circuit 14.

A clock signal of a certain period is introduced to a set input terminal S of the flip-flop circuit 13. The flip-flop circuit 13 has an output terminal Q connected to an input terminal I of a driver circuit 15.

The driver circuit 15 has an output terminal P connected to gates of P-type MOS transistors M1, M2 and M3. The output terminal P of the driver circuit 15 is also connected to a gate of a P-type MOS transistor M5 of the reference voltage generation circuit 21 and gates of an N-type MOS transistor M10 and P-type MOS transistor M11 of a first compensated voltage generation circuit 23. The driver circuit 15 has an output terminal N connected to a gate of an N-type MOS transistor M4.

The P-type MOS transistor MI has a source connected to a supply voltage Vin. The P-type MOS transistor M1 has a drain connected to a drain of the N-type MOS transistor M4 and an inductor L1 through a connection point T3. A series circuit 16, which has the P-type MOS transistors M2 and M3, is connected in parallel between the source and drain of the P-type MOS transistor M1. The N-type MOS transistor M4 has a source connected to the ground potential. The inductor L1 is connected to the output (external) voltage terminal $V_{out}$ and capacitor C1 through the connection point T1.

Drive signals of the same phase are issued from the output terminals P and N of the driver circuit 15, thereby causing the P-type MOS transistor M1 and the N-type MOS transistor M4 to be alternately turned on/off. That is, electric charging occurs in the capacitor C1 when the P-type MOS transistor M1 is turned on, and the electric discharging occurs in the capacitor C1 when the N-type MOS transistor M4 is turned on. As a result, the P-type MOS transistor M1 functions to supply the output voltage, and the N-type MOS transistor M4 functions to discharge the output voltage. Also, the drive signal from the output terminal P of the driver circuit 15 is supplied to the P-type MOS transistors M2 and M3 of the series circuit 16, so that the P-type MOS transistors M2 and M3 are turned on/off in synchronization with the P-type MOS transistor M1 for the supply of the output voltage. The P-type MOS. transistor M1, N-type MOS transistor M4 and series circuit 16 constitute in combination a switching circuit 17. It should be noted that the switching circuit 17 is not limited to the above-described configuration and may have, for example, the P-type MOS transistor M1 and the N-type MOS transistor M4. Also, a clock circuit, the flip-flop circuit 13 and the driver circuit 15 may constitute a drive signal generation circuit.

A connection point T4 between a drain of the P-type MOS transistor M2 and a source of the P-type MOS transistor M3 is connected to a positive input terminal of an operational amplifier circuit 18. The operational amplifier circuit 18 has a negative input terminal connected to a connection point T5 between a drain of the P-type MOS transistor M5 and a source of a P-type MOS transistor M6. That is, voltage drops, or drain voltages, of the P-type MOS transistor M2 and P-type MOS transistor M5 are introduced to the input terminals of the operational amplifier circuit 18, respectively. The operational amplifier circuit 18 has an output terminal connected to a gate of the P-type MOS transistor M6.

The P-type MOS transistor M5 has a source connected to the supply voltage Vin. The gate of the P-type MOS transistor M5 is connected to the output terminal P of the driver circuit 15, as already mentioned. The drain of the P-type MOS transistor M5 is connected to the source of the P-type MOS transistor M6 through the connection point T5. The P-type MOS transistor M6 has a drain connected to the ground potential through a resistor R4. The drain of the P-type MOS transistor M6 is also connected to a positive input terminal of an operational amplifier circuit 19 through a resistor R5. The P-type MOS transistor M5, P-type MOS transistor M6, operational amplifier circuit 18 and resistor 4 constitute in combination a current sensing circuit 20.

For example, assuming that the ON resistance of the P-type MOS transistor M1 (namely, the resistance of the P-type MOS transistor M1 when conducting) is 0.4Ω, the ON resistance of the P-type MOS transistor M2 is 30Ω, the ON resistance of the P-type MOS transistor M3 is 10Ω, the P-type MOS transistor M5 has a size of $\frac{1}{100}$ that of the P-type MOS transistor M2 and current flowing through the inductor L1 when the switching circuit 17 is in its ON state is IL, then the sensed current $I_{sense}$ flowing through the series circuit 16 can be expressed by the following equation (1):

$$I_{sense} = \frac{IL \times 0.4}{0.4 + 30 + 10} \cong \frac{IL}{100}$$

Because drain-source voltages of the P-type MOS transistors M2 and M5 are equal and gate-source voltages of the P-type MOS transistors M2 and M5 are equal, current $I_{se2}$ of 1/100 the current $I_{sense}$ flowing through the P-type MOS transistor M5 flows. As a result, a voltage $V_{se}$ at a connection point T6 can be expressed by the following equation (2):

$$V_{se} = \frac{R4 \times IL}{10000}$$

It should be assumed here that the P-type MOS transistor M2 and the P-type MOS transistor M5 are different in only size and the same in temperature characteristic and other characteristics including aged deterioration (namely, there is matching between the two MOS transistors). Then, the voltage $V_{se}$ at the connection point T6 is not subject to a deviation which would otherwise be caused by supply voltage dependencies of the input terminal voltages of the operational amplifier circuit 18. Thus, it is possible to sense the current IL flowing through the inductor L1 with high precision.

In the case where the switching circuit 17 has the P-type MOS transistor M1 and the N-type MOS transistor M4, the P-type MOS transistor M5 may have the same characteristics as those of the P-type MOS transistor M1.

The precision of current detection by the current sensing circuit 20 may vary with an absolute value of the resistor R4. As a result, the current sensing precision can be increased (improved) by implementing the resistor R4 with a low temperature dependency.

Alternatively, the resistor R4 may be a variable resistor whose resistance can vary with trimming, and the resistance of the resistor R4 may be adjusted such that the voltage $V_{se}$ at the connection point T6 satisfies the equation (2) when arbitrary current flows through the switching circuit 17. This adjustment can prevent an error from occurring due to a manufacturing deviation of the DC-DC converter 10.

The positive input terminal of the operational amplifier circuit 19 is connected to a resistor R8 through a connection point T7. The operational amplifier circuit 19 has a negative input terminal connected to a source of an N-type MOS transistor M7. The negative input terminal of the operational amplifier circuit 19 is connected to the ground potential through a resistor R6. The N-type MOS transistor M7 has a drain connected to a drain and gate of a P-type MOS transistor M8. The P-type MOS transistor MB has a source connected to the supply voltage Vin. The drain of the N-type MOS transistor M7 and the gate of the P-type MOS transistor M8 are also connected to a gate of a P-type MOS transistor M9.

The P-type MOS transistor M9 has a source connected to the supply voltage Vin and a drain connected to the ground potential through a connection point T8 and a resistor R7. The drain of the P-type MOS transistor M9 is also connected to the positive input terminal of the PWM comparator 12 through the connection point T8. As a result, a voltage at the connection point T8 is introduced as the reference voltage $V_{ref}$ to the positive input terminal of the PWM comparator 12. The current sensing circuit 20, resistors R5 to R7, operational amplifier circuit 19, N-type MOS transistor M7, P-type MOS transistor M8 and P-type MOS transistor M9 constitute in combination the reference voltage generation circuit 21.

The resistor R8 is connected to the resistor R5 and the positive input terminal of the operational amplifier circuit 19 through the connection point T7. The resistor R8 is also connected to a drain of the N-type MOS transistor M10 through a connection point T9. The gate of the N-type MOS transistor M10 is connected to the output terminal P of the driver circuit 15, as mentioned already. The N-type MOS transistor M10 has a source connected to the ground potential.

The resistor R8 and the drain of the N-type MOS transistor M10 are connected to a capacitor C2 and a drain of the P-type MOS transistor M11 through the connection point T9 and a connection point T10. The P-type MOS transistor M11 has a source connected to a current source 22. The gate of the P-type MOS transistor M11 is connected to the output terminal P of the driver circuit 15, as mentioned previously. The current source 22 is also connected to the supply voltage Vin. The N-type MOS transistor M10, P-type MOS transistor M11, resistor R8, capacitor C2 and current source 22 constitute in combination the first compensated voltage generation circuit 23.

In the first compensated voltage generation circuit 23, when the switching circuit 17 is turned on, the N-type MOS transistor M10 is turned off and the P-type MOS transistor M11 is turned on. In this case, the capacitor C2 can be charged. On the other hand, when the N-type MOS transistor M10 is turned on, a voltage on the capacitor C2 instantaneously falls. Also, because the voltage on the capacitor C2 is introduced to the positive input terminal of the operational amplifier circuit 19 through the resistor R8, it is added to the voltage $V_{se}$ at the connection point T6.

An N-type MOS transistor M12 has a drain connected to the connection point T10 of the first compensated voltage generation circuit 23. The N-type MOS transistor M12 has a source connected to the ground potential and a gate connected to a gate and drain of an N-type MOS transistor M13. The N-type MOS transistor M13 has a source connected to the ground potential. As a result, the N-type MOS transistor M12 and the N-type MOS transistor M13 constitute in combination a current mirror circuit 24.

The drain of the N-type MOS transistor M13 is also connected to a drain of a P-type MOS transistor M14. The P-type MOS transistor M14 has a source connected to the supply voltage Vin and a gate connected to a gate and drain of a P-type MOS transistor M15. The P-type MOS transistor M15 has a source connected to the supply voltage Vin. As a result, the P-type MOS transistor M14 and the P-type MOS transistor M15 constitute in combination a current mirror circuit 25.

The drain of the P-type MOS transistor M15 is also connected to a drain of an N-type MOS transistor M16. The N-type MOS transistor M16 has a source connected to a resistor R9 and a negative input terminal of an operational amplifier circuit 26. The operational amplifier circuit 26 also has an output terminal connected to a gate of the N-type MOS transistor M16 and a positive input terminal connected to the external control voltage input terminal PABIAS. The resistor R9 is also connected to the ground potential. The current mirror circuits 24 and 25, N-type MOS transistor M16, resistor R9 and operational amplifier circuit 26 constitute in combination a second compensated voltage generation circuit 27.

The second compensated voltage generation circuit 27 is a circuit that further corrects (namely, generates a twice-compensated voltage) a compensated voltage generated by the first compensated voltage generation circuit 23 on the basis of an external control voltage $V_{PABIAS}$. The external control voltage $V_{PABIAS}$ is converted into a current signal $I_{PABIAS}$ by the operational amplifier circuit 26, N-type MOS transistor M16 and resistor R9. The current signal $I_{PABIAS}$ is changed in its direction by the current mirror circuit 25 and thus flows to the current mirror circuit 24. When the current signal $I_{PABIAS}$ flows through the current mirror circuit 24, a part of the current from the current source 22 to be charged into the capacitor C2 flows to the current mirror circuit 24 because the current mirror circuit 24 is connected to the connection point T10. That is, when the current signal $I_{PABIAS}$ becomes higher in level, the amount of electric charges to be accumulated in the capacitor C2 drops, thus reducing the level (amount) of an added voltage at the connection point T7.

Next, the operation of the DC-DC converter 10 will be described in detail with reference to FIG. 2.

A clock pulse of a certain period is supplied to the set input terminal S of the flip-flop circuit 13. The flip-flop circuit 13 is set at a rising edge of the clock pulse, thereby causing the output terminal Q to become high in level.

The output terminal of the PWM comparator 12 is connected to the reset input terminal R of the flip-flop circuit 13. After the flip-flop circuit 13 is set, it is reset in response to an output signal from the PWM comparator 12, thus returning the output terminal Q to a low level. Specifically, when a voltage introduced to the positive input terminal of the PWM comparator 12 becomes higher than a voltage given to the negative input terminal of the PWM comparator 12, an output signal from the output terminal of the PWM comparator 12 is outputted as a reset signal. As a result, when the voltage introduced to the positive input terminal of the PWM comparator 12 becomes higher than the voltage supplied to the negative input terminal of the PWM comparator 12, the output terminal Q of the flip-flop circuit 13 becomes low in level and is kept low until a next clock pulse is received, and the output terminal P of the driver circuit 15 also becomes low in level (see the second to fourth waveforms in FIG. 2).

When a drive signal (high-level signal) is generated from the output terminal P of the driver circuit 15, the P-type MOS transistors M1, M2 and M3 of the switching circuit 17 are turned on, so that the current IL flowing through the inductor L1 and the sensed current $I_{sense}$ flowing through the series circuit 16 increase. Also, because the P-type MOS transistor M5 of the reference voltage generation circuit 21 is turned on, the voltage $V_{se}$ at the connection point T6 increases.

On the other hand, when low-level signals are outputted from the output terminals P and N of the driver circuit 15, the P-type MOS transistors M1, M2, M3 and M5 are turned off and the N-type MOS transistor M4 is turned on, so that the current IL, sensed current $I_{sense}$ and voltage $V_{se}$ drop (see the fifth to seventh waveforms in FIG. 2).

In the meantime, the output voltage $V_{out}$ repetitively increases and decreases based on the current IL although the amount of increase/decrease is very small (see the eighth waveform in FIG. 2).

Thereafter, when the voltage of PABIAS drops, the voltage supplied to the negative input terminal of the PWM comparator 12 rises (see the first and second waveforms in FIG. 2). This voltage variation of PABIAS lengthens a period in which the voltage supplied to the positive input terminal of the PWM comparator 12 is lower than the voltage supplied to the negative input terminal of the PWM comparator 12. As a result, the pulse width of the high-level signal produced from the output terminal P of the driver circuit 15 is also lengthened (see the fourth waveform in FIG. 2). That is, the ON period of the switching circuit 17 is removed and the amount of electric charges to be accumulated in the capacitor C1 is increased, thus increasing the output voltage (see the eighth waveform in FIG. 2).

It should be noted that the DC-DC converter 10 may be a buck-type converter or boost-type converter.

As apparent from the foregoing description, the reference voltage generation circuit 21 in the DC-DC converter 10 according to the present embodiment, which generates a reference voltage $V_{ref}$ for determination of the pulse width of a drive signal to be supplied to the switching circuit 17, includes the current sensing circuit 20 composed of the P-type MOS transistor M5, P-type MOS transistor M6, resistor R4 and operational amplifier circuit 18. Therefore, it is possible to perform high precision current sensing irrespective of element (device) characteristics such as a supply voltage dependency and a temperature dependency. Consequently, the DC-DC converter 10 can achieve stabilization of an output voltage.

Although the preferred embodiments of the present invention have been disclosed for illustrative purposes, those skilled in the art will appreciate that various changes, modifications, additions and substitutions are possible, without departing from the scope and spirit of the invention as defined in the accompanying claims.

This application is based on Japanese Patent Application No. 2007-326783 filed on Dec. 19, 2007 and the entire disclosure thereof is incorporated herein by reference.

What is claimed is:

1. A DC-DC converter comprising:
    a switching circuit that is turned on in response to a drive signal for relaying a supply voltage to an output voltage terminal through an inductor;
    a driving signal supply circuit for supplying the drive signal to the switching circuit;
    a reference voltage generation circuit connected to the switching circuit for generating a reference voltage based on an input-output voltage of the switching circuit; and
    a reset signal supply circuit connected to the reference voltage generation circuit for generating a reset signal based on the reference voltage and supplying the reset signal to the drive signal supply circuit, the reset signal stopping the supply of the drive signal,
    wherein the reference voltage generation circuit comprises a current sensing circuit, the current sensing circuit including:
    a first metal oxide semiconductor (MOS) transistor having a gate connected to the drive signal supply circuit and a source connected to the supply voltage;
    a second MOS transistor connected in series to the first MOS transistor;
    a resistive element connected in series to the second MOS transistor; and
    an amplifier circuit for amplifying the input-output voltage of the switching circuit and supplying the amplified voltage to a gate of the second MOS transistor.

2. The DC-DC converter according to claim 1, wherein the switching circuit comprises a series circuit including an output voltage supply MOS transistor and an output voltage discharge MOS transistor.

3. The DC-DC converter according to claim 2, wherein the switching circuit further comprises a series circuit including two MOS transistors connected between a source and drain of the output voltage supply MOS transistor.

4. The DC-DC converter according to claim 3, wherein the first MOS transistor has the same characteristics, with the exception of an ON resistance, as those of the voltage supply MOS transistor or one of the two MOS transistors.

5. The DC-DC converter according to claim 3, wherein the ON resistance of the first MOS transistor is smaller than that of the voltage supply MOS transistor or one of the two MOS transistors.

6. The DC-DC converter according to claim 1, wherein the resistive element has a low temperature dependency.

7. The DC-DC converter according to claim 1, wherein the resistive element is a variable resistive element having a resistance varying with trimming.

8. The DC-DC converter according to claim 1, wherein the DC-DC converter is a buck-type or a boost-type converter.

9. The DC-DC converter according to claim 1, wherein the DC-DC converter is a current mode control type.

* * * * *